US011041572B2

(12) United States Patent
Fujinami et al.

(10) Patent No.: US 11,041,572 B2
(45) Date of Patent: Jun. 22, 2021

(54) ANNULAR VALVE AND VALVE BODY FOR ANNULAR VALVE

(71) Applicant: Mitsui E&S Machinery Co., Ltd., Tokyo (JP)

(72) Inventors: Masaru Fujinami, Tamano (JP); Hirofumi Himei, Tamano (JP); Tsukasa Suzuki, Tamano (JP); Kazuhiro Shimizu, Tamano (JP); Shuji Ishihara, Tamano (JP); Kazuki Takizawa, Tamano (JP); Kouichi Takemoto, Tamano (JP)

(*) Notice: Subject to any disclaimer, the term of this patent is extended or adjusted under 35 U.S.C. 154(b) by 0 days.

(21) Appl. No.: 16/606,155

(22) PCT Filed: Mar. 16, 2018

(86) PCT No.: PCT/JP2018/010559
§ 371 (c)(1),
(2) Date: Oct. 17, 2019

(87) PCT Pub. No.: WO2018/193774
PCT Pub. Date: Oct. 25, 2018

(65) Prior Publication Data
US 2020/0370668 A1 Nov. 26, 2020

(30) Foreign Application Priority Data
Apr. 17, 2017 (JP) .............................. JP2017-081622

(51) Int. Cl.
F16K 15/12 (2006.01)
F16K 15/08 (2006.01)

(52) U.S. Cl.
CPC .............. F16K 15/12 (2013.01); F16K 15/08 (2013.01)

(58) Field of Classification Search
CPC . F16K 15/08; F16K 15/12; F16K 1/34; F16K 1/36; F16K 1/42; Y10T 137/7839; Y10T 137/784
See application file for complete search history.

(56) References Cited

U.S. PATENT DOCUMENTS 1,354,318 A * 9/1920 Longacre ................ F16K 15/12
137/516.21
1,550,376 A * 8/1925 Longacre ................ F16K 15/08
137/514.3

(Continued)

FOREIGN PATENT DOCUMENTS

AT          391928 B       6/1990
CN       106090269 A      11/2016

(Continued)

OTHER PUBLICATIONS

SIPO, First Office Action for CN201880025163.1, dated Mar. 12, 2020.

Primary Examiner — Kevin F Murphy
(74) Attorney, Agent, or Firm — Hodgson Russ LLP

(57) ABSTRACT

An annular valve in which the shape of a sealing surface of a valve body is optimized thus suppressing the occurrence of pressure loss in gas on the periphery of the sealing surface and extending the service life of the annular valve. The annular valve comprises: a valve seat 10 formed in a plate-like shape and including passage flow channels 11 each having an opening cross section formed in an arcuate shape; a receiving plate 20 formed in a plate-like shape and having discharge flow channels 21, the receiving plate 20 being arranged to face the valve seat 10 by way of an intermediate chamber 50; a valve body 30 formed in an annular shape corresponding to the arcuate shape of the opening cross section of the passage flow channel 11 and being arranged in the intermediate chamber 50, the valve (Continued)

body 30 being brought into contact with/separated from the valve seat 10 so as to open/close the passage flow channel 11; and a plurality of spring members 40 supported by the receiving plate 20, the spring members 40 each biasing elastically the valve body 30 toward the valve seat 10. A sealing surface 31 of the valve body 30 that faces the passage flow channel 11 is formed in a shape where at least one of pressure loss elements with respect to gas flowing towards the valve body 30 from the passage flow channel 11 is eliminated.

4 Claims, 6 Drawing Sheets

(56) References Cited

U.S. PATENT DOCUMENTS

| | | |
|---|---|---|
| 3,536,094 A | 10/1970 | Manley, Jr. |
| 5,052,434 A | 10/1991 | Bauer |
| 5,511,583 A | 4/1996 | Bassett |
| 5,678,603 A | 10/1997 | Tschop |
| 9,416,678 B2 * | 8/2016 | Hamada ................ F16K 1/54 |
| 9,765,770 B2 * | 9/2017 | Babbini ............... F16K 15/08 |
| 2001/0029981 A1 | 10/2001 | Penza |
| 2002/0002997 A1 | 1/2002 | Steinruck et al. |

FOREIGN PATENT DOCUMENTS

| | | | |
|---|---|---|---|
| EP | 1148282 A2 | 10/2001 | |
| EP | 1826407 A1 | 8/2007 | |
| GB | 829952 A * | 3/1960 | ........... F16K 15/08 |
| JP | H01075671 U | 5/1989 | |
| JP | H0249979 A | 2/1990 | |
| JP | 2591824 B2 | 3/1997 | |
| JP | 2015503692 A | 2/2015 | |

* cited by examiner

[FIG.1]
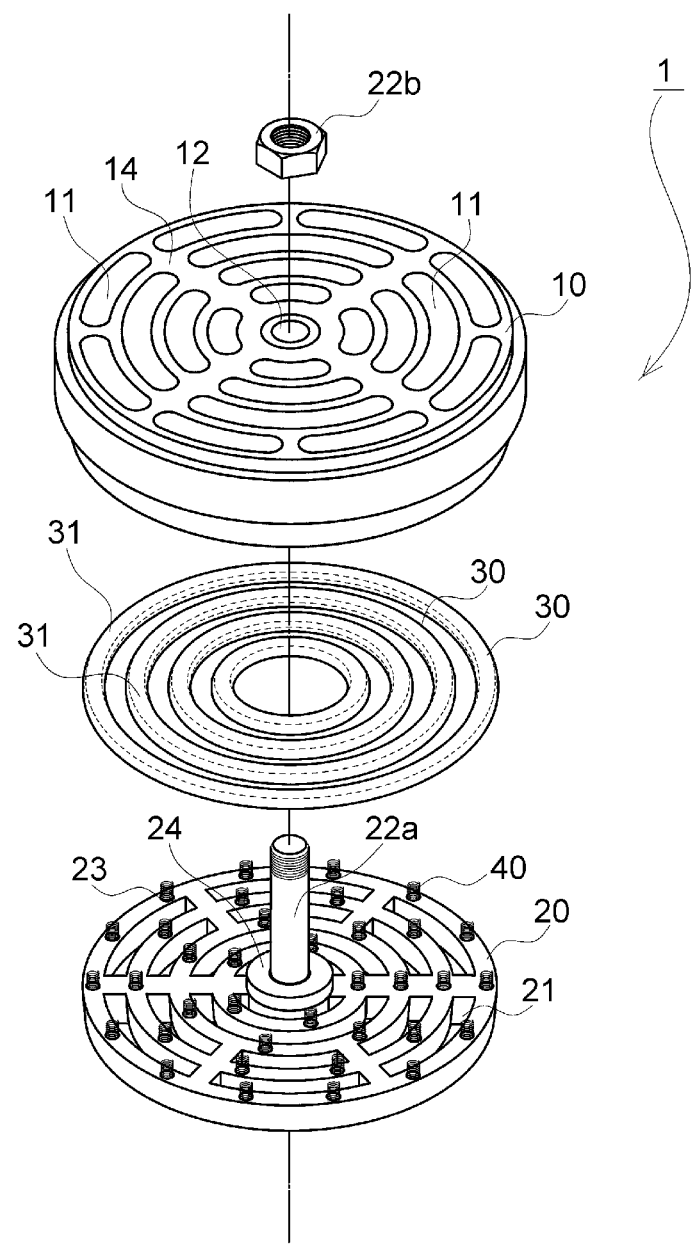

[FIG.2]
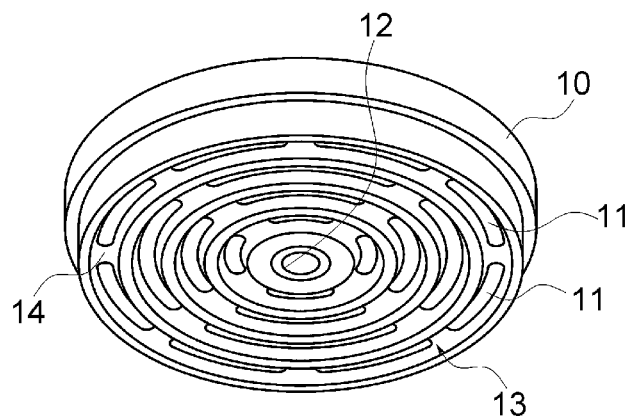
[FIG.3]
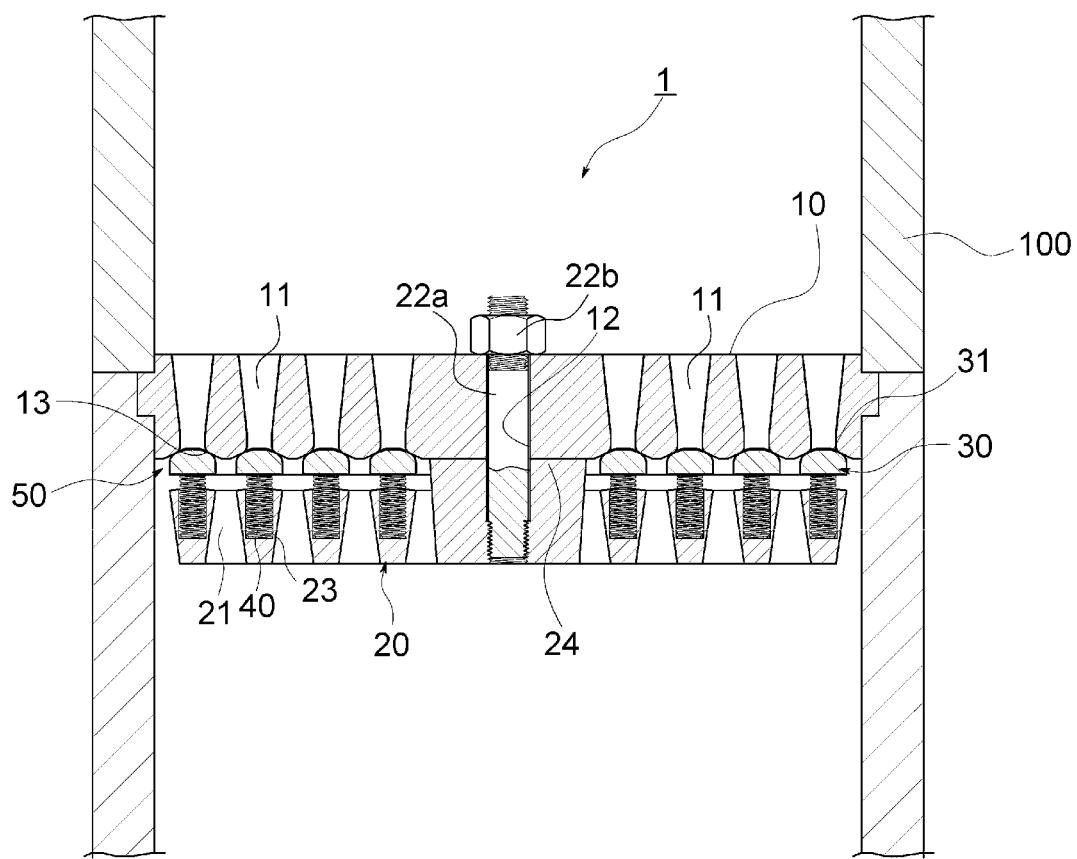

[FIG.4]
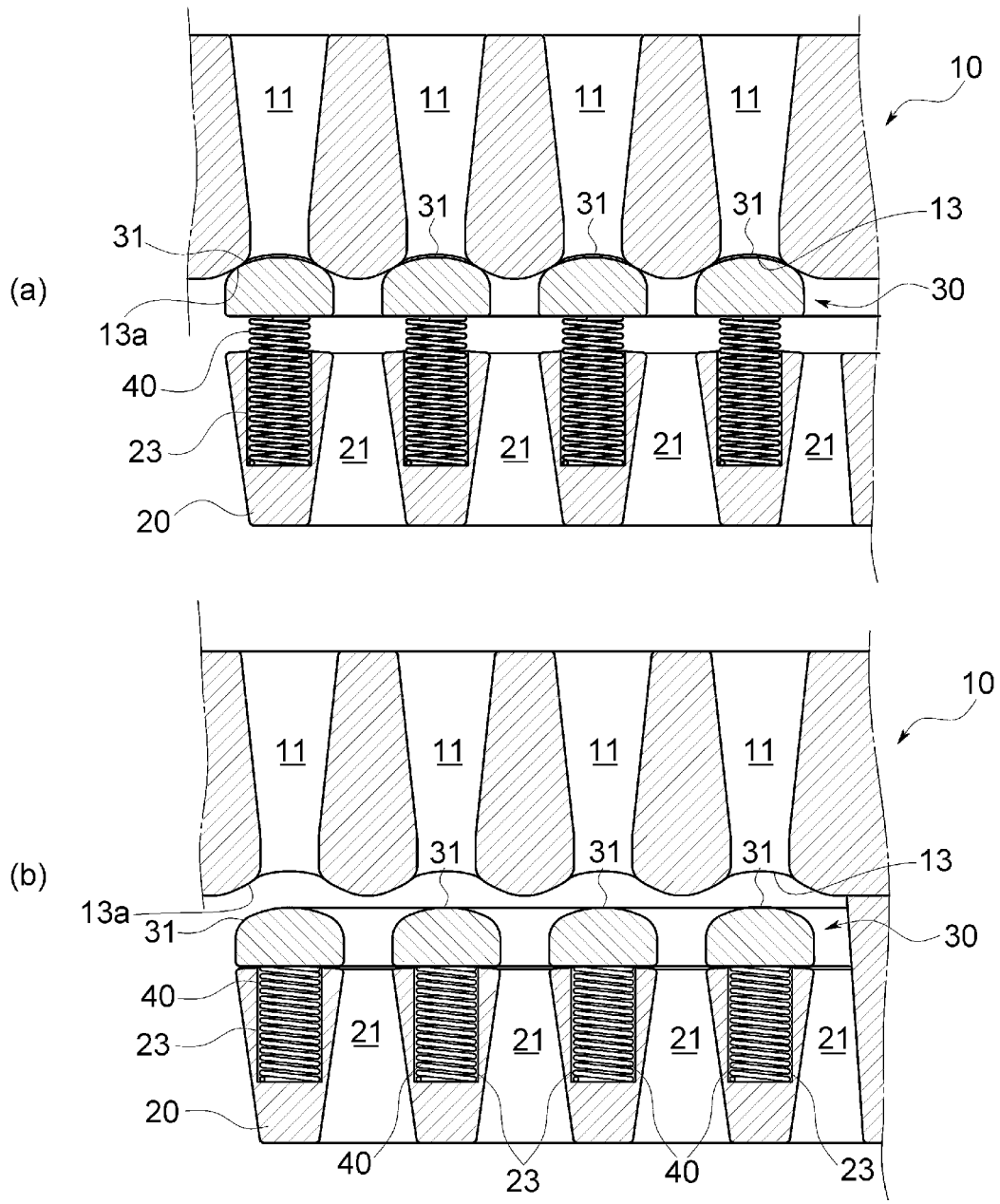

[FIG.5]
(a)
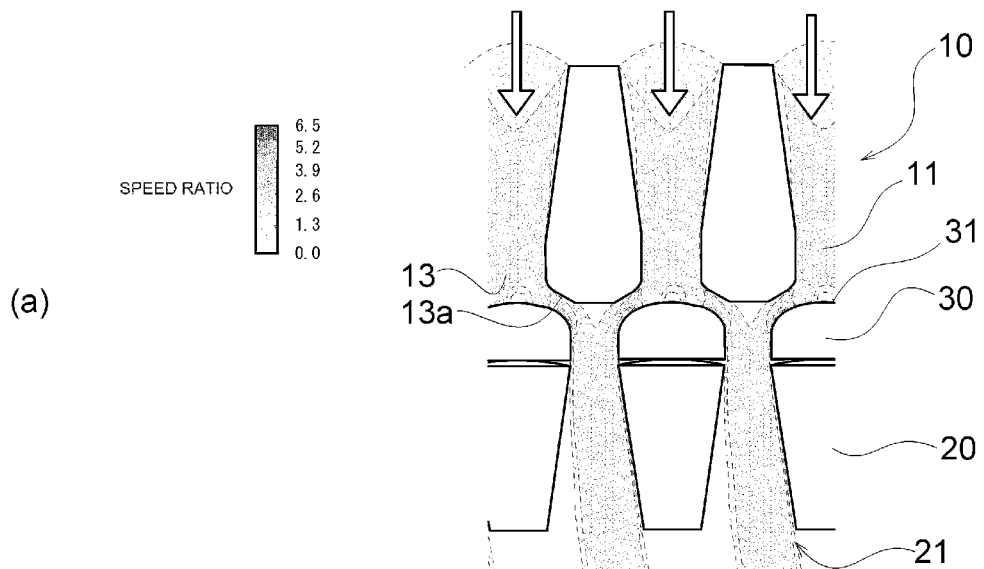
(b)
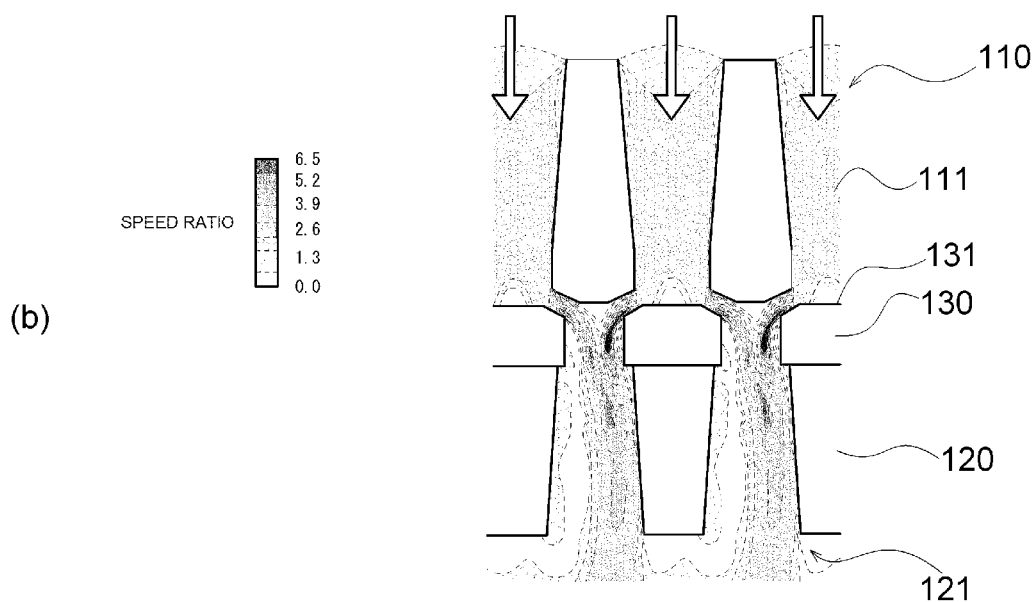

[FIG.6]
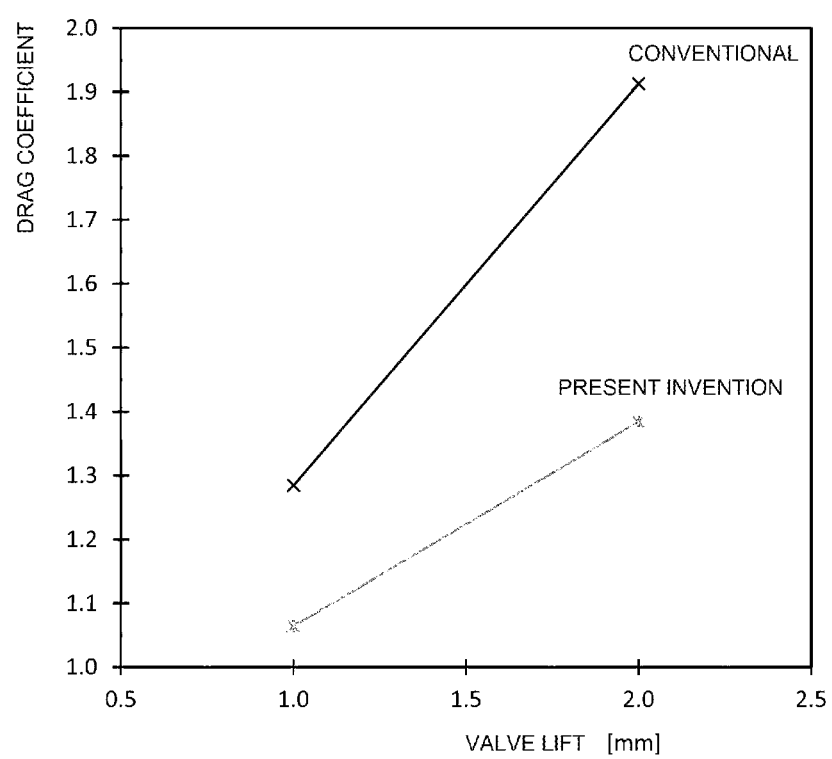

ANNULAR VALVE AND VALVE BODY FOR ANNULAR VALVE

TECHNICAL FIELD

The present invention relates to an annular valve and a valve body for the annular valve used for a compressor or the like, and specifically to an annular valve and a valve body for the annular valve, the valve body having a sealing surface the shape of which is optimized thus suppressing the occurrence of pressure loss on the periphery of the sealing surface and extending the service life of the valve body for an annular valve and the annular valve.

BACKGROUND

Conventionally, an annular valve has been used for a compressor or the like. The annular valve includes, as illustrated in FIG. 7, a valve seat 110 formed in a plate-like shape and having a plurality of passage flow channels 111 each of which has an opening cross section formed in an arcuate shape; a receiving plate 120 formed in a plate-like shape and having a plurality of discharge flow channels 121, the receiving plate 120 being arranged to face the valve seat 110 by way of an intermediate chamber 150; and a valve plate 130 arranged in the intermediate chamber 150 (see Patent Literature 1). The valve plate 130 is supported by a valve receiver (support plate) 132 on a side thereof that faces the receiving plate 120. The valve plate 130 and the valve receiver (support plate) 132 constitute a valve body. In the valve body, with the valve receiver (support plate) 132 being left, only the valve plate 130 is replaceable.

The valve plate 130 has a plurality of sealing surfaces 131 each of which is formed in an arcuate shape corresponding to the arcuate shape of the opening cross section of the passage flow channel 111. The sealing surfaces 131 are formed as a plurality of arcuate-shaped projecting rims. The valve plate 130 is brought into contact with/separated from the valve seat 110, thereby allowing the respective sealing surfaces 131 to contact with/separated from the opening end surfaces of the respective passage flow channels 111 thus opening and closing the passage flow channels 111.

The valve plate 130 is elastically biased to the valve seat 110 by a plurality of spring members 140 by way of the valve receiver (support plate) 132. The spring members 140, each of which is a compression spring, are arranged between the receiving plate 120 and the valve receiver (support plate) 132. In the natural state of the annular valve, the valve plate 130 is biased by the spring members 140 so as to bring the respective sealing surfaces 131 into pressure contact with the opening end surfaces of the respective passage flow channels 111 thus closing the passage flow channels 111.

CITATION LIST

Patent Literatures

Patent Literature 1: JP-B-2591824

SUMMARY OF THE INVENTION

Problem to be Solved by the Invention

In the annular valve mentioned above, when the pressure of the gases in the passage flow channels 111 increases and exceeds the biasing force of the spring members 140, each of the sealing surfaces 131 is pressed by the pressure of the gases, and the valve plate 130 is separated from the valve seat 110 against the biasing force of the spring members 140. Then, the gas in each of the passage flow channels 111 flow into the periphery of the sealing surface 131 from the opening end surface of the passage flow channel 111, and flows toward the discharge flow channel 121 of the receiving plate 120. The gas flowing toward the discharge flow channel 121 is discharged to the outside of the annular valve through the discharge flow channel 121.

As for the gas that flows, in this manner, toward the discharge flow channel 121 from the passage flow channel 111, a flow channel resistance in the annular valve causes pressure loss. Since each of the sealing surfaces 131 is formed as the arcuate-shaped projecting rims, pressure loss is caused in a part that connects the respective sealing surfaces 131 to each other (a part between the respective sealing surfaces 131). Furthermore, since the sealing surface 131 has a pressure loss element (such as an edge-shaped ridgeline part) with respect to gas, pressure loss in gas is caused on the periphery of the sealing surface 131. The sealing surface 131 has the edge-shaped ridgeline part in order to bring the sealing surface 131 into surface contact with the valve seat 110. Furthermore, the boundary line between the valve plate 130 and the valve receiver (support plate) 132 is formed in a stepped shape, the stepped shape causes pressure loss and, at the same time, the separation of air flow occurs behind the valve plate 130 thus causing the pressure loss.

Such pressure loss causes energy loss in the annular valve, and becomes a factor that increases significantly the load on a power sources (a pump or the like) for increasing the pressure of gas. From the viewpoint of energy saving in recent years, a decrease in energy loss in such an annular valve is strongly required. Furthermore, such pressure loss causes instability of the movement of the valve body, and accelerates the abrasion of the valve plate 130, the spring member 140, and the receiving plate 120 thus giving rise to the short service life of the annular valve.

However, the conventional annular valve does not sufficiently suppress the occurrence of the pressure loss in gas on the periphery of the sealing surface of the valve plate, and is unable to decrease the energy loss.

Accordingly, it is an object of the present invention to provide an annular valve and a valve body for the annular valve, the valve body having a sealing surface the shape of which is optimized thus suppressing the occurrence of the pressure loss in gas on the periphery of the sealing surface and extending the service life of the valve body for an annular value and the annular valve.

The other objects of the present invention are apparent from the following description.

Means for Solving Problem

The above-mentioned objects are achieved by each of the following aspects of the present invention.

1. An annular valve comprising:

a valve seat formed in a plate-like shape, the valve seat including a plurality of passage flow channels, the passage flow channels each having an opening cross section formed in an arcuate shape;

a receiving plate formed in a plate-like shape, the receiving plate having a plurality of discharge flow channels and being arranged to face the valve seat by way of an intermediate chamber;

a valve body formed in an annular shape corresponding to the arcuate shape of the opening cross section of the passage flow channel, the valve body being arranged in the intermediate chamber, the valve body being brought into contact with/separated from the valve seat so as to open/close the passage flow channels; and a plurality of spring members supported by the receiving plate, the spring members biasing elastically the valve body toward the valve seat, wherein a sealing surface of the valve body is configured to face the passage flow channel, and formed in a shape where at least one of pressure loss elements with respect to gas flowing towards the valve body from the passage flow channel is eliminated.

2. An annular valve comprising:

a valve seat formed in a plate-like shape;

a plurality of passage flow channels, the passage flow channels each having an opening cross section formed in an arcuate shape and being arranged on a concentric circle with the center axis of the valve seat as the center;

a plurality of annular grooves, the annular grooves each extending over the passage flow channels located on the concentric circle;

a receiving plate formed in a plate-like shape, the receiving plate having a plurality of discharge flow channels and arranged to face the valve seat by way of an intermediate chamber;

a valve body formed in an annular shape corresponding to the arcuate shape of the opening cross section of the passage flow channel, the valve body being arranged in the intermediate chamber, the valve body being brought into contact with/separated from the valve seat so as to open/close the passage flow channels; and a plurality of spring members supported by the receiving plate, the spring members each biasing elastically the valve body toward the valve seat, wherein a sealing surface of the valve body is configured to face the flow channels, the sealing surface is formed in a torus shape, the sealing surface is brought into line contact with both brim portions of the annular groove, and there is no stepped portion between the receiving plate and the valve body.

3. An annular valve comprising:

a valve seat formed in a plate-like shape;

a plurality of passage flow channels, the passage flow channels each having an opening cross section formed in an arcuate shape and arranged on a concentric circle with the center axis of the valve seat as the center;

a plurality of annular grooves, the annular grooves each extending over the passage flow channels located on the same concentric circle;

a receiving plate formed in a plate-like shape, the receiving plate having a plurality of discharge flow channels and arranged to face the valve seat by way of an intermediate chamber;

a valve body formed in an annular shape corresponding to the arcuate shape of the opening cross section of the passage flow channel, the valve body being arranged in the intermediate chamber, the valve body being brought into contact with/separated from the valve seat so as to open/close the passage flow channels; and a plurality of spring members supported by the receiving plate, the spring members each biasing elastically the valve body toward the valve seat, wherein a sealing surface of the valve body facing the passage flow channel is formed in a torus shape where a pressure loss element with respect to gas flowing towards the valve body from the passage flow channel is eliminated, and a surface of the valve seat facing the sealing surface is formed in a torus shape where a pressure loss element with respect to gas flowing towards the valve body from the passage flow channel is eliminated.

4. The annular valve according to 1, 2, or 3, wherein the sealing surface of the valve body is configured to face the passage flow channel, the sealing surface has respective longitudinal sectional shapes located on an outer periphery and an inner-periphery of the valve body, and the longitudinal sectional shapes are identical with each other.

5. The annular valve according to any one of 1 to 4, wherein the surface of the valve seat is configured to face the sealing surface, and formed in a shape where at least one of the pressure loss elements with respect to the gas flowing towards the valve body from the passage flow channel is eliminated.

6. The annular valve according to any one of 1 to 5, wherein a surface of the valve seat facing the sealing surface is formed in a convex torus shape being smooth to the periphery of the surface of the valve seat, and each of both brim portions of the annular groove is brought into line contact with the sealing surface.

7. A valve body for an annular valve, the valve body being formed in an annular shape corresponding to an arcuate shape of an opening cross section of a passage flow channel formed in a valve seat, the valve body being brought into contact with/separated from the valve seat so as to open/close the passage flow channel, wherein a surface of the valve body configured to open/close the passage flow channel generates no gas flow separation when the passage flow channel is opened so as to flow gas from the passage flow channel.

Effect of the Invention

According to the present invention, with a valve body having a sealing surface the shape of which is optimized, it is possible to suppress the occurrence of the pressure loss in gas on the periphery of the sealing surface and extend the service life of the valve body for an annular valve and the annular valve.

BRIEF DESCRIPTION OF DRAWINGS

FIG. 1 is an exploded perspective view illustrating the constitution of an annular valve of the present invention.

FIG. 2 is a perspective view illustrating the outflow side of a valve seat.

FIG. 3 is a cross-sectional view illustrating the state of use of the annular valve in FIG. 1.

FIG. 4 is an enlarged cross-sectional view illustrating an essential part of the annular valve in FIG. 1.

FIG. 5A is a cross-sectional view illustrating the flow of gas on the periphery of a sealing surface in the annular valve in FIG. 1.

FIG. 5B is a cross-sectional view illustrating the flow of gas on the periphery of a sealing surface in an annular valve in FIG. 7.

FIG. 6 is a graph illustrating drag coefficients on the periphery of each of the respective sealing surfaces in the annular valve in FIG. 1 and a conventional annular valve.

DESCRIPTION OF THE EMBODIMENTS

Figure 7:
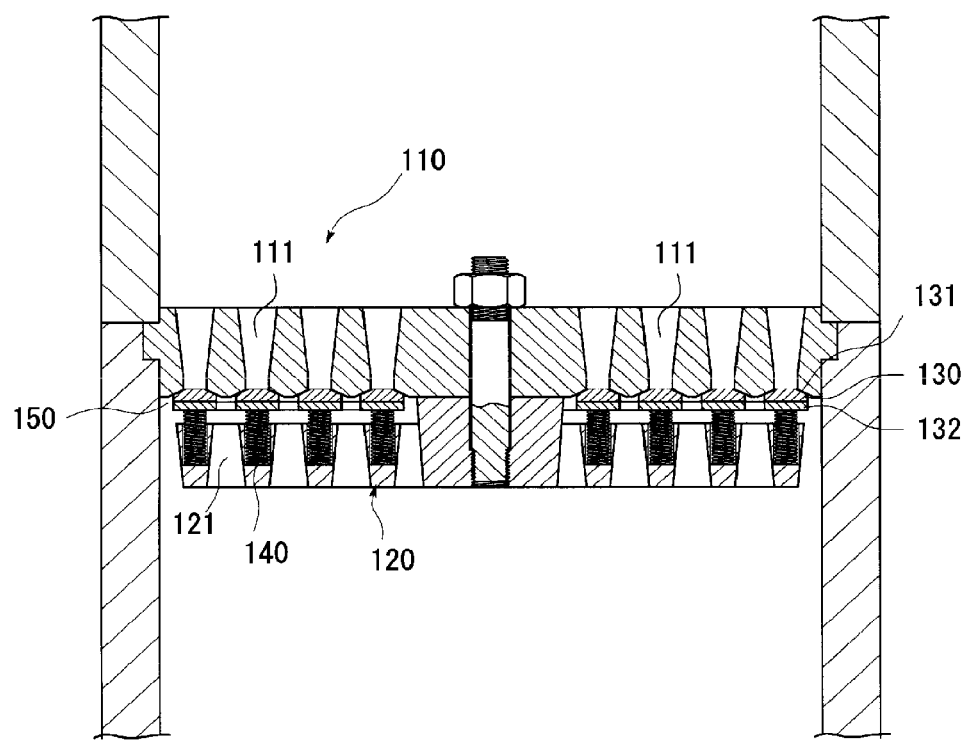
FIG. 7 is a cross-sectional view illustrating the constitution of the conventional annular valve.

Hereinafter, an embodiment of the present invention is specifically explained in conjunction with drawings.

FIG. 1 is an exploded perspective view illustrating the constitution of an annular valve according to the present invention.

An annular valve 1 includes, as illustrated in FIG. 1, a valve seat 10, a receiving plate 20, and a valve body 30 for the annular valve, the valve body (the valve element) 30 being arranged between the valve seat 10 and the receiving plate 20.

The valve seat 10 formed in a plate-like shape (a disc-like shape) with a metallic material or the like has a circular outer periphery, and has a plurality of passage flow channels 11. Each of the passage flow channels 11 is a through hole extending from the outer-surface side of the valve seat 10 (an upper side in FIG. 1) (hereinafter, referred to as "an inflow side") to the inner-surface side of the valve seat 10 (a lower side in FIG. 1) (hereinafter, referred to as "an outflow side"). Each of the passage flow channels 11 that has an opening cross section formed in an arcuate shape is arranged on a corresponding concentric circle with the center axis of the valve seat 10 as the center.

FIG. 2 is a perspective view illustrating the outflow side of the valve seat.

On the outflow side of the valve seat 10, as illustrated in FIG. 2, the annular groove 13 extending over the passage flow channels 11 located on each of the concentric circles is formed, and the annular grooves 13 different in diameter from each other are, as a whole, formed on the respective concentric circles with the center axis of the valve seat 10 as the center. As viewed from the outflow side, each of the passage flow channels 11 opens to the bottom of the annular groove 13. Consequently, brim portions of the annular groove 13 that face the outflow side constitute an opening end of each of the passage flow channels 11.

The annular valve 1 has, as illustrated in FIG. 1, the receiving plate 20 formed, with a metallic material or the like, in a plate-like shape (a disc-like shape) having a circular outer periphery. The outside diameter of the receiving plate 20 is substantially equal to the outside diameter of the valve seat 10. The receiving plate 20 includes a plurality of discharge flow channels 21. Each of the discharge flow channels 21 is a through hole extending from the outer-surface side of the receiving plate 20 (the upper side in FIG. 1) (hereinafter, referred to as the "inflow side") to the inner-surface side of the receiving plate 20 (the lower side in FIG. 1) (hereinafter, referred to as the "outflow side"). The discharge flow channels 21 that each have an opening cross section formed in an arcuate shape are arranged on respective concentric circles with the center axis of the receiving plate 20 as the center.

Here, in the present embodiment, although the opening cross section of the discharge flow channel 21 is formed in an arcuate shape, the shape of the opening cross section is not limited to this example, and may be any desired shape provided that a spring member 40 described later can be attached to and supported by the discharge flow channel 21.

FIG. 3 is a cross-sectional view illustrating the state of use of the annular valve 1 in FIG. 1.

The annular valve 1 is, as illustrated in FIG. 3, used in a state where the annular valve 1 is fitted in the inside of a cylindrical member 100 that constitutes the flow channel of gas (liquid vapor may also be contained in the gas). The valve seat 10 is set in the inside of the cylindrical member 100 in a state where the outer peripheral face of the valve seat 10 is brought into close contact with the inner peripheral face of the cylindrical member 100. The receiving plate 20 is arranged to face the valve seat 10 in a predetermined spaced apart manner. A space sandwiched between the valve seats 10 and the receiving plate 20 and surrounded by the inner peripheral face of the cylindrical member 100 constitutes an intermediate chamber 50. Consequently, the valve seat 10 and the receiving plate 20 are arranged to face each other in an opposed manner by way of the intermediate chamber 50.

The receiving plate 20 is, in the present embodiment, supported by the valve seat 10 at the center portion thereof by way of a support rod 22a. The support rod 22a is implanted into (threadedly engaged with) the center portion of the receiving plate 20 at the proximal-end portion thereof, and extended towards the inflow side of the receiving plate 20. The receiving plate 20 has a projection portion 24 formed on the periphery of the support rod 22a, the projection portion 24 having a predetermined height (the height of the intermediate chamber 50). The distal-end side of the support rod 22a is inserted into a center hole 12 of the valve seat 10. The projection portion 24 is, then, brought into contact with the center portion located on the outflow side of the valve seat 10. The projection portion 24 is brought into contact with the valve seat 10 thus forming a space having a predetermined height (the height of the intermediate chamber 50) between the inflow side of the receiving plate 20 (a peripheral part of the projection portion 24) and the outflow sides of the valve seat 10. In the support rod 22a whose distal-end side is inserted into the center hole 12 of the valve seat 10, a nut 22b is threadedly engaged with a thread groove formed on the distal-end side of the support rod 22a thus fastening the distal-end side of the support rod 22a to the center portion of the valve seat 10.

Here, the support rod 22a may be implanted into the center hole 12 of the valve seat 10, and extended towards the outflow side of the receiving plate 20. In this case, the distal-end side of the support rod 22a is inserted into the center portion of the receiving plate 20, and fixed to the receiving plate 20. In this case also, the receiving plate 20 is supported by the valve seat 10 at the center portion thereof by way of the support rod 22a.

Furthermore, the outer peripheral face of the receiving plate 20 may be positioned and supported by the inner peripheral face of the cylindrical member 100. In this case, it is unnecessary to use the support rod 22a and the nut 22b, and it is also unnecessary to form the center hole 12 in the valve seat 10.

As illustrated in FIG. 1 and FIG. 3, a plurality of the valve bodies 30 are arranged in the intermediate chamber 50. Each of the valve bodies 30 is formed in an annular shape corresponding to the arcuate shape of the opening cross section of the passage flow channel 11, that is, in an annular shape corresponding to each of the annular grooves 13 formed in the outflow side of the valve seat 10. The valve body 30 is formed in a substantially semicircular shape as viewed in a longitudinal sectional view, the arcuate portion of the semicircular shape faces the inflow side, and the planar part of the semicircular shape faces the outflow side. The valve body 30 is composed of a metallic material, a synthetic resin material, or their composite material.

FIG. 4 is an enlarged cross-sectional view illustrating the constitution of the essential part of the annular valve 1 in FIG. 1.

The valve body 30 is, as illustrated in FIG. 4, brought into contact with/separated from the valve seat 10, and brought into contact with/separated from both rim portions of the annular groove 13 thus opening and closing the passage flow channel 11. In the valve body 30, a part (the upper surface part (the inflow side) of the valve body 30 in FIG. 4) that is brought into contact with/separated from both rim portions of the annular groove 13 to open/close the passage flow channel 11 constitutes a sealing surface 31. The sealing surface 31 of the valve body 30 is formed in a torus shape (a doughnut-like shape). The sealing surface 31 and both brim portions of the annular groove 13 are not brought into surface contact with each other, and brought into line contact with each other. As for the sealing surface 31, it is preferable for the outer periphery and inner periphery of the valve body 30 to have respective longitudinal sectional shapes identical with each other.

Furthermore, each of both brim portions of the annular groove 13 of the valve seat 10 (the contact surface 13a of the valve seat 10 that is brought into contact with the sealing surface 31) may also be formed in a convex torus shape that is smooth to the periphery thereof. In this case also, the sealing surface 31 and both brim portions of the annular groove 13 are brought into line contact with each other.

As illustrated in FIG. 1, FIG. 3, and FIG. 4, the receiving plate 20 supports a plurality of the spring members 40 in respective support holes 23 formed on the inflow side of the receiving plate 20. Each of the spring members 40 is inserted into the support hole 23 so as to be supported. Each of the spring members 40 is arranged at positions corresponding to each of the valve bodies 30. Each of the spring members 40, which is a compression spring, is arranged between the planar part located on the outflow side of the valve body 30 (a bottom part in FIG. 1, FIG. 3, and FIG. 4) and the receiving plate 20. Each of the spring members 40 elastically biases the valve body 30 toward the valve seat 10.

In the natural state of the annular valve 1, each of the valve bodies 30 is, as illustrated in FIG. 4A, biased by each of the spring members 40 so as to bring the sealing surface 31 thereof into pressure contact with both brim portions of the corresponding annular groove 13 thus closing the corresponding passage flow channel 11. When a pressure of high-pressure gas or the like in the passage flow channel 11 increases and exceeds a biasing force caused by the spring members 40, the sealing surface 31 is, as illustrated in FIG. 4B, pressed by the pressure of the gas, and the valve body 30 is separated from the valve seat 10 against the biasing force caused by the spring members 40. The gas in the passage flow channel 11, then, flows into the periphery of the sealing surface 31 from the opening end surface (both brim portions of the annular groove 13) of the passage flow channel 11, and flows toward the discharge flow channel 21 of the receiving plate 20. The gas flowing toward the discharge flow channel 21 is discharged to the outside of the annular valve 1 through the discharge flow channel 21.

FIG. 5A is a cross-sectional view illustrating the flow of gas on the periphery of the sealing surface in the annular valve, which is illustrated in FIG. 1, according to the embodiment of the present invention, and FIG. 5B is a cross-sectional view illustrating the flow of gas on the periphery of the sealing surface in the annular valve illustrated in FIG. 7.

The valve body 30 eliminates, as illustrated in FIG. 5A, at least one of pressure loss elements thereof with respect to the gas flowing towards the valve body 30 from the passage flow channel 11 (the pressure loss element indicates a shape element that generates the flow separation of gas from the sealing surface 31, for example, an edge-shaped ridgeline part or the like), and the valve body 30 has hence no such pressure loss element thus suppressing the occurrence of the pressure loss of the gas on the periphery of the sealing surface 31. Consequently, power costs required for sending the gas can be reduced. FIG. 5 illustrates the degree of pressure loss depending on the magnitude of speed ratio due to the local speed change of the gas on the periphery of the sealing surface 31. In the present embodiment, the speed ratio is approximately equal to or less than 4.

Furthermore, in a case where the respective longitudinal sectional shapes of the sealing surface 31 on the outer periphery side and the inner-periphery side of the valve body 30 are made identical with each other, when gas flows into the valve body 30 from the passage flow channel 11, the flow separation of the gas from the sealing surface 31 is not generated thus suppressing the occurrence of pressure loss.

In particular, when each of both brim portions of the annular groove 13 of the valve seat 10 (the contact surface 13a of the valve seat 10 that is brought into contact with the sealing surface 31) is formed in a convex torus shape that is smooth to the periphery thereof, the flow of the gas in the periphery of the sealing surface 31 is smoother thus suppressing the pressure loss of the gas to lower levels.

Furthermore, in the annular valve 1, at least one of the pressure loss elements with respect to gas is eliminated thus stabilizing the movement of the valve body 30, and extending the respective service lives of the valve body 30, the spring member 40, and the receiving plate 20.

In the annular valve illustrated in FIG. 7, as illustrated in FIG. 5B, the valve plate 130 has pressure loss elements with respect to the gas flowing into the valve plate 130 from the passage flow channel 111, for example, the valve plate 130 has the pressure loss element of the edge-shaped ridgeline part or the like thus generating the flow separation of the gas on the periphery of the sealing surface 131, and increasing the pressure loss of the gas.

In the annular valve 1 according to the present invention, the shape of the sealing surface 31 is designed based on computational fluid dynamics (CFD) analyses and wind tunnel experiments so as to eliminate pressure loss elements with respect to gas, and maximize the effective area with respect to the flow of gas. The effective area is maximized, suppresses the occurrence of the pressure loss of the gas on the periphery of the sealing surface 31. Here, the effective area with respect to the flow of the gas correlates with the magnitude of a flow channel resistance and hence, when the effective area is maximized, a geometric passage area required for obtaining the same effective area is small.

FIG. 6 is a graph illustrating drag coefficients on the periphery of each of the respective sealing surfaces in the annular valve in FIG. 1 and a conventional annular valve.

As illustrated in FIG. 6, with respect to the annular valve 1 according to the present invention and the conventional annular valve, a relation between a valve lift and a ratio of drag coefficients was obtained, where the valve lift indicates a travel of the valve body 30 that is a distance between the sealing surface 31 of the valve body 30 and both brim portions of the annular groove 13, and the ratio of drag coefficients indicates a comparison value of a value corresponding to a Cd value. In the conventional annular valve, to set a drag coefficient at a valve lift of 2.0 mm as 1.0, a ratio of drag coefficients at a valve lift of 1.0 mm was approximately 0.65. On the other hand, in the annular valve 1 according to the present invention, a ratio of drag coefficients at a valve lift of 1.0 mm was approximately 0.54, and a ratio of drag coefficients at a valve lift of 2.0 mm was not higher than approximately 0.74. That is, in the annular valve 1 according to the present invention, even when the valve lift is increased, and a large quantity of gas is caused to flow from the passage flow channel 11 toward the discharge flow channel 21, the drag coefficient does not increase as compared with the case of the conventional annular valve thus suppressing the occurrence of the pressure loss of the gas on the periphery of the sealing surface 31.

In the annular valve 1 according to the present invention, as illustrated in FIG. 6, the drag coefficient is small thus suppressing the occurrence of the pressure loss of gas on the periphery of the sealing surface 31, and the movement of the valve body 30 is stabilized thus extending the respective service lives of the valve body 30, the spring members 40, and the receiving plate 20.

REFERENCE SIGNS LIST

10: valve seat
11: passage flow channel
12: center hole
13: annular groove
13a: contact surface
14: wall portion
20: receiving plate
21: discharge flow channel
22a: support rod
22b: nut
23: support hole
24: projection portion
30: valve body
31: sealing surface
40: spring member
50: intermediate chamber
100: cylindrical member

The invention claimed is:

1. An annular valve comprising:
a valve seat formed in a plate-like shape;
a plurality of passage flow channels, the passage flow channels each having an opening cross section formed in an arcuate shape and being arranged on a concentric circle with the center axis of the valve seat as the center;
a plurality of annular grooves, the annular grooves each extending over the passage flow channels located on the concentric circle;
a receiving plate formed in a plate-like shape, the receiving plate having a plurality of discharge flow channels and arranged to face the valve seat by way of an intermediate chamber;
a valve body formed in an annular shape corresponding to the arcuate shape of the opening cross section of the passage flow channels, the valve body being arranged in the intermediate chamber, the valve body closing the passage flow channels by contacting the valve seat and opening the passage flow channels by separating from the valve seat; and
a plurality of spring members supported by the receiving plate, the spring members each biasing elastically the valve body toward the valve seat, wherein
a sealing surface of the valve body is formed in an annular shape along each of the annular grooves, the sealing surface of the valve body has a torus shape that is convex toward the annular grooves, and the sealing surface of the valve body is configured to face the passage flow channels, and when the passage flow channels are closed, the sealing surface linearly contacts each of both brim portions of the annular grooves,
an inner wall surface of each of the discharge flow channels of the receiving plate is radially flush with respect to the valve body when the passage flow channels are opened, and each of both brim portions of the annular grooves facing the sealing surface of the valve body is formed in a convex torus shape being smooth to adjacent surfaces of the valve seat, and each of both brim portions of the annular groove is brought into linear contact with the sealing surface.

2. The annular valve according to claim 1, wherein the torus shape of the sealing surface of the valve body facing the passing flow channels is symmetrical with respect to the vertical axis in the vertical cross-sectional shape.

3. An annular valve comprising:
a valve seat formed in a plate-like shape;
a plurality of passage flow channels, the passage flow channels each having an opening cross section formed in an arcuate shape and arranged on a concentric circle with the center axis of the valve seat as the center;
a plurality of annular grooves, the annular grooves each extending over the passage flow channels located on the same concentric circle;
a receiving plate formed in a plate-like shape, the receiving plate having a plurality of discharge flow channels and arranged to face the valve seat by way of an intermediate chamber;
a valve body formed in an annular shape corresponding to the arcuate shape of the opening cross section of the passage flow channels, the valve body being arranged in the intermediate chamber, the valve body closing the passage flow channels by contacting the valve seat and opening the passage flow channels by separating from the valve seat; and
a plurality of spring members supported by the receiving plate, the spring members each biasing elastically the valve body toward the valve seat, wherein
a sealing surface of the valve body facing the passage flow channels is formed in a smooth convex torus shape with respect to adjacent surfaces of the valve body, and
each of both brim portions of the annular grooves facing the sealing surface of the valve body is formed in a convex torus shape being smooth with respect to adjacent surfaces of the valve seat.

4. An annular valve comprising:
a valve seat formed in a plate-like shape, the valve seat including a plurality of passage flow channels, the passage flow channels each having an opening cross section formed in an arcuate shape;
a receiving plate formed in a plate-like shape, the receiving plate having a plurality of discharge flow channels and being arranged to face the valve seat by way of an intermediate chamber;
a plurality of annular grooves, the annular grooves each extending over the passage flow channels located on the same concentric circle;
a valve body formed in an annular shape corresponding to the arcuate shape of the opening cross section of the passage flow channel, the valve body being arranged in the intermediate chamber, the valve body closing the passage flow channels by contacting the valve seat and opening the passage flow channels by separating from the valve seat; and
a plurality of spring members supported by the receiving plate, the spring members biasing elastically the valve body toward the valve seat, wherein
a sealing surface of the valve body facing the passage flow channel is formed in a smooth shape with respect to adjacent surfaces of the valve body, and
each of both brim portions of the annular grooves facing the sealing surface of the valve body is formed in a convex torus shape being smooth to adjacent surfaces of the valve seat, and when the passage flow channels are closed by the valve body, the each of both brim portions of the annular grooves linearly contacts the sealing surface of the valve body.

* * * * *